United States Patent
Han

(10) Patent No.: US 11,402,558 B2
(45) Date of Patent: Aug. 2, 2022

(54) TRANSPARENT SUBSTRATE PROVIDED WITH MULTI-LAYERED COATING AND INSULATION GLAZING UNIT INCLUDING THE SAME

(71) Applicant: SAINT-GOBAIN GLASS FRANCE, Courbevoie (FR)

(72) Inventor: Jin Woo Han, Seoul (KR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 16/981,108

(22) PCT Filed: May 9, 2019

(86) PCT No.: PCT/KR2019/005550
§ 371 (c)(1),
(2) Date: Sep. 15, 2020

(87) PCT Pub. No.: WO2019/216661
PCT Pub. Date: Nov. 14, 2019

(65) Prior Publication Data
US 2021/0017811 A1  Jan. 21, 2021

(30) Foreign Application Priority Data
May 9, 2018  (KR) .................. 10-2018-0053264

(51) Int. Cl.
*B32B 15/04* (2006.01)
*B32B 17/06* (2006.01)
(Continued)

(52) U.S. Cl.
CPC ............ *G02B 5/282* (2013.01); *C03C 17/366* (2013.01); *C03C 17/3626* (2013.01);
(Continued)

(58) Field of Classification Search
CPC .................... C03C 17/3639; C03C 17/366
(Continued)

(56) References Cited

U.S. PATENT DOCUMENTS 5,718,980 A    2/1998  Koch et al.
10,766,808 B2 * 9/2020  Biswas .............. C03C 17/3642
(Continued)

FOREIGN PATENT DOCUMENTS

EP        0 728 712 A1    8/1996
KR    10-2013-0080870 A   7/2013
(Continued)

OTHER PUBLICATIONS

Si3N4 refractive index info, 2021.*
International Search Report as issued in International Patent Application No. PCT/KR2019/005550, dated Aug. 13, 2019.

*Primary Examiner* — Lauren R Colgan
(74) *Attorney, Agent, or Firm* — Pillsbury Winthrop Shaw Pittman LLP

(57) ABSTRACT

A transparent substrate provided with a multi-layered coating is provided, the coating including the following in an order from the substrate: a first dielectric film including one or more dielectric layers, a first metallic protective layer, a first metallic layer having an infrared (IR) reflection characteristic, a second metallic protective layer, a second dielectric film including two or more dielectric layers, a third metallic protective layer, a second metallic layer having an infrared (IR) reflection characteristic, a fourth metallic protective layer, and a third dielectric film D3 including one or more dielectric layers, wherein the dielectric layer includes a metal oxide, a metal nitride, or a metal oxynitride, the metallic layer is silver (Ag) or a silver (Ag)-containing metal alloy, a normal emissivity is 2.0% or less, and a difference between a coated surface reflectance and an uncoated surface reflectance is 21% or more.

17 Claims, 2 Drawing Sheets

(51) Int. Cl.
*G02B 5/28* (2006.01)
*C03C 17/36* (2006.01)

(52) U.S. Cl.
CPC ...... *C03C 17/3639* (2013.01); *C03C 17/3644* (2013.01); *C03C 17/3649* (2013.01); *C03C 17/3681* (2013.01); *C03C 2217/211* (2013.01); *C03C 2217/216* (2013.01); *C03C 2217/256* (2013.01); *C03C 2217/261* (2013.01); *C03C 2217/281* (2013.01); *C03C 2218/154* (2013.01)

(58) Field of Classification Search
USPC .......................................... 428/428, 432, 434
See application file for complete search history.

(56) References Cited

U.S. PATENT DOCUMENTS

| | | | | |
|---|---|---|---|---|
| 11,027,527 | B2 * | 6/2021 | Biswas | C03C 17/36 |
| 2004/0016202 | A1 * | 1/2004 | Hoffman | C03C 17/3652 52/786.13 |
| 2004/0224167 | A1 * | 11/2004 | Stachowiak | C03C 17/3626 428/432 |
| 2005/0123772 | A1 | 6/2005 | Coustet et al. | |
| 2007/0087155 | A1 * | 4/2007 | Kariyada | G11B 7/24038 428/64.4 |
| 2009/0068447 | A1 * | 3/2009 | Blacker | C03C 17/36 428/336 |
| 2011/0262726 | A1 * | 10/2011 | Knoll | C03C 17/3626 428/213 |
| 2014/0071524 | A1 * | 3/2014 | Disteldorf | C03C 17/3435 359/360 |
| 2014/0098415 | A1 * | 4/2014 | Wuillaume | G02B 5/208 359/360 |
| 2016/0177618 | A1 * | 6/2016 | Knoll | B32B 7/02 428/216 |
| 2019/0241466 | A1 * | 8/2019 | Biswas | C03C 17/3652 |

FOREIGN PATENT DOCUMENTS

| | | |
|---|---|---|
| KR | 10-2018-0026440 A | 3/2018 |
| WO | WO 97/43224 A1 | 11/1997 |
| WO | WO 99/28258 A1 | 6/1999 |

* cited by examiner

[Fig. 1]
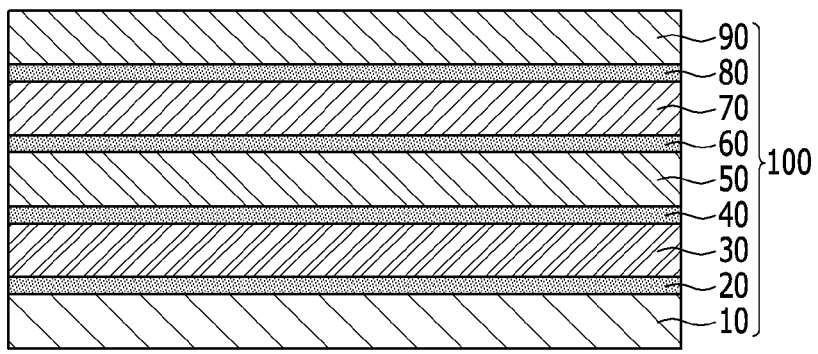
[Fig. 2]
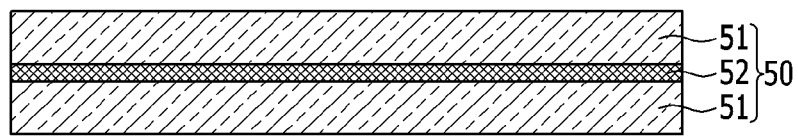
[Fig. 3]
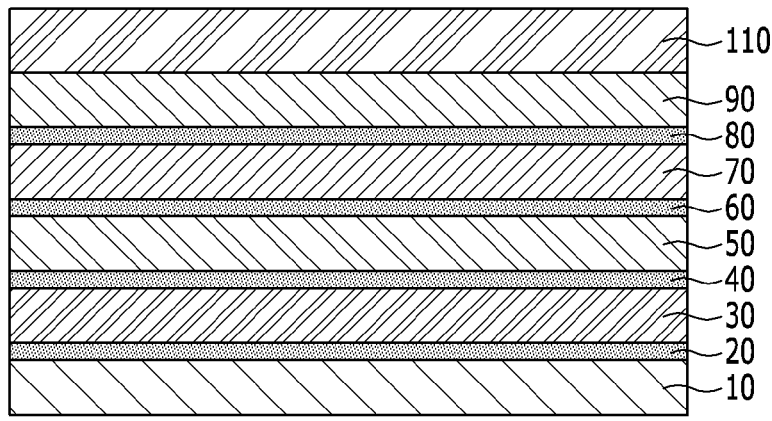
[Fig. 4]
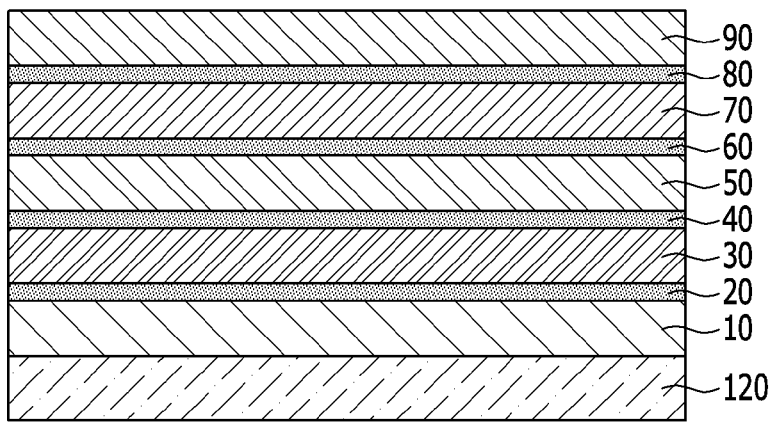

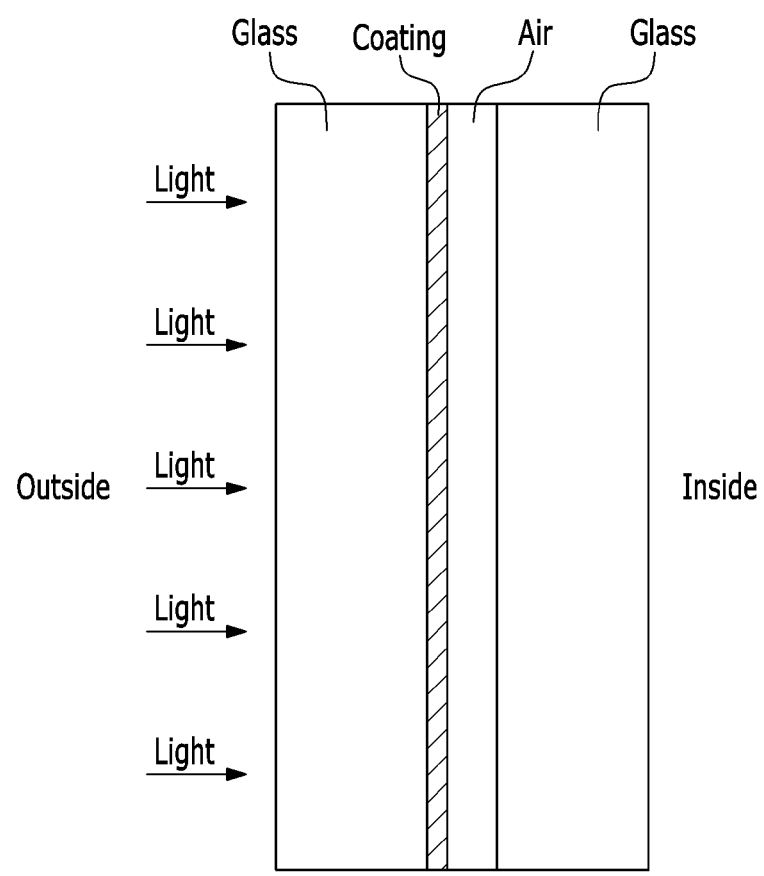
[Fig. 5]

TRANSPARENT SUBSTRATE PROVIDED WITH MULTI-LAYERED COATING AND INSULATION GLAZING UNIT INCLUDING THE SAME

CROSS-REFERENCE TO RELATED APPLICATIONS

This application is the U.S. National Stage of PCT/KR2019/005550, filed May 9, 2019, which in turn claims priority to Korean patent application number 10-2018-0053264 filed May 9, 2018. The content of these applications are incorporated herein by reference in their entireties.

TECHNICAL FIELD

The present invention relates to a transparent substrate provided with a multi-layered coating, and an insulation glazing unit including the same.

BACKGROUND ART

A low-emissivity glass is a glass on which a low-emissivity layer including a metal having high reflectance in an infrared region such as silver (Ag) is deposited as a thin film.

A coating in the low-emissivity glass is generally composed of multiple layers including a dielectric material layer. When the coating is deposited on a transparent substrate (glass substrate), reflection of visible light is decreased and transmission is increased, thereby improving visibility of an object behind the substrate. In order to increase an anti-reflection effect, the coating may be provided on both surfaces of the substrate. Examples of the anti-reflection coating are disclosed in EP 0 728 712 and WO 97-43224.

In general, it is preferred that the glass has a low emissivity and a low solar heat gain ratio for increasing an insulation effect. For this, a thickness of a metallic layer (for example, a silver (Ag) layer) of a coating film having low emissivity should be increased. When two or more metallic layers are used, it has a merit of low emissivity and high selectivity, as compared with the case of using one layer. However, in spite of the merit, when it is intended to use two or more metallic layers while exhibiting high reflectance (exhibiting external reflectance of visible rays of 30% or more, with a bright silver color), the following problems arise.

First, the transmission color represents a greenish/yellowish color.

In general, when two or more layers are used as a metallic layer, a thickness of the metallic layer is greater than that using only one layer. Furthermore, high reflectance of 30% or more is required for representing a bright silver color, which means the thickness of the metallic layer should be greater. However, when the thickness of the metallic layer is increased, a blue color is absorbed so that a transmission color or reflection color may be closer to a green-based color. That is, the thicker the metallic layer, the higher the absorptance. Thus, a conventional substrate including two or more metallic layers show a more greenish or yellowish transmittance color (a low a* TL value or a high b* TL value), as compared with a single metallic layered substrate. In the following Table 1, the transmission colors of a substrate having two metallic layers (double low-E coating) and a substrate having one metallic layer (single low-E coating) are compared, under the condition in which the uncoated surface reflectance and the uncoated surface reflection color are almost the same. It is recognized that the double-metallic layered substrate has a lower a* value and a higher b* value of the transmission color, as compared with the single-metallic layered substrate.

TABLE 1

|  | Visible transmission (TL) | | | Uncoated surface reflection | | | SHGC | Selectivity | Normal |
| --- | --- | --- | --- | --- | --- | --- | --- | --- | --- |
|  | % | a* | b* | YDELETEDTEXTS | a* | b* | (NFRC) | (NFRC) | emissivity |
| Single-layer substrate | 50.8 | −3.3 | 1.3 | 26.8 | −2.0 | −3.7 | 0.380 | 1.337 | 0.040 |
| Double-layer substrate | 46.0 | −6.2 | 3.5 | 28.3 | −2.0 | −3.8 | 0.256 | 1.797 | 0.025 |

(Coated on a 6 mm transparent glass substrate, based on a single glazing unit) Second, color coordinate values of the uncoated surface reflection color are greatly varied depending on the angle.

The double-metallic layered substrate has more internal optical interferences, and thus, has a larger reflection color change depending on the angle. Moreover, when the reflectance is higher, color sensitivity recognized by a human eye is increased, and thus a substrate having higher reflectance and double metallic layers is vulnerable to a color change depending on the angle, as compared with a substrate having a single metallic layer. In the following Table 2, reflection colors at 60° of the double-metallic layer substrate and the single-metallic layered substrate are compared, under the condition that the reflectance and the reflection color viewed at an angle of 0° are the same. It is recognized that a color difference of the double-layered substrate is larger than that of the single-metallic layered substrate (see Table 2).

TABLE 2

|  | 0° | | | 60° | | $(a^{*}0°-a^{*}60°)^2 +$ |
| --- | --- | --- | --- | --- | --- | --- |
|  | % | a* | b* | a*60° | b*60° | $(b^{*}0°-b^{*}60°)^2$ |
| Single-metalic layered substrate | 28 | −1.7 | −3.3 | −2.6 | −4.1 | 1.5 |
| Double-metalic layered substrate | 28 | −2 | −3.2 | −5.1 | −6.2 | 18.6 |

(Coated on an uncoated surface reflection color, 6 mm transparent glass substrate, based on a single glazing unit) Third, as the external reflectance is increased, the internal reflectance is also increased (see Table 3).

TABLE 3

|  | External reflectance (%) | Internal reflectance (%) |
| --- | --- | --- |
| Double-metalic layered substrate A | 28.0 | 14.3 |
| Double-metalic layered substrate B | 11.6 | 11.1 |
| Double-metalic layered substrate C | 6.3 | 4.9 |

(Based on a double glazing unit) As seen from Table 3, as a result of performing measurement for three kinds of different substrates including two metallic layers, it was shown that the external reflectance was increased in the order of C, B, and A, and the internal reflectance was also increased in the order of C, B, and A.

In the case of the transparent substrate, various characteristics directly related to the sputter-coated layer system to be used, such as emissivity, uncoated-surface reflectance, coated-surface reflectance, selectivity, or colors, should have appropriate values. However, since these characteristics may compete with each other, it is important to find an appropriate balance point between them.

(Patent Document 1) EP 0 728 712
(Patent Document 2) WO 97-43224

DISCLOSURE OF INVENTION

Technical Problem

The present invention has been made in an effort to provide a transparent substrate including two or more metallic layers and an insulation glazing unit including the transparent substrate having advantages of having balanced characteristics while solving the problems of the conventional substrates as described above, and allowing the colors required by consumers to be distinguished.

Solution to Problem

An exemplary embodiment of the present invention provides a transparent substrate provided with a multi-layered coating, the coating including the following in an order from the substrate: a first dielectric film including one or more dielectric layers, a first metallic lower protective layer, a first metallic layer having an infrared (IR) reflection characteristic, a first metallic upper protective layer, a second dielectric film including two or more dielectric layers, a second metallic lower protective layer, a second metallic layer having an infrared (IR) reflection characteristic, a second metallic upper protective layer, and a third dielectric film including one or more dielectric layers, wherein the dielectric layer includes a metal oxide, a metal nitride, or a metal oxynitride, the metal is one or more selected from the group consisting of Si, Zn, Nb, and Sn, and Zr may be included as a dopant, the metal protective layer includes one or more selected from the group consisting of Ti, Ni, Cr, and Nb, the metallic layer is Ag (silver) or a Ag-containing metal alloy, a normal emissivity is 2.0% or less, and a difference between a coated surface reflectance and an uncoated surface reflectance is 21% or more.

Another embodiment of the present invention provides an insulation glazing unit including two or more transparent substrates which are spaced apart in parallel with each other, wherein one or more transparent substrates of the substrates is the aforementioned transparent substrate.

Advantageous Effects of Invention

Although the substrate according to the present invention includes two or more metallic layers and uses a thick metallic layer for implementing high reflectance, the substrate has a less greenish/yellowish transmission color (a high a* TL value and a low b* TL value). In addition, a color change depending on an angle is small. In addition, the substrate may have low coated surface reflectance while maintaining high uncoated surface reflectance.

BRIEF DESCRIPTION OF DRAWINGS

FIG. 1 shows a multi-layered coating 100 of a transparent substrate provided with the multi-layered coating according to an exemplary embodiment of the present invention.

FIG. 2 shows an example of a second dielectric film 50 of the multi-layered coating of FIG. 1.

FIG. 3 shows a multi-layered coating of a transparent substrate provided with a multi-layered coating according to another exemplary embodiment of the present invention.

FIG. 4 shows a transparent substrate provided with a multi-layered coating according to an exemplary embodiment of the present invention.

FIG. 5 shows an insulation glazing unit including two or more transparent substrates according to an exemplary embodiment of the present invention.

MODE FOR THE INVENTION

Hereinafter, a transparent substrate provided with a multi-layered coating according to the present invention and an insulation glazing unit including the same will be described in more detail, with reference to accompanying drawings. However, the description is only presented by way of example for facilitating understanding of the present invention, and the scope of the present invention is not limited to the illustrative description.

Terms used in the present invention have the following meanings.

The term, 'layer(s)' may refer to one layer, that is, a single layer, or two or more layers, that is, multiple layers. Herein, each layer forming the multiple layers satisfies the requirements corresponding to the layer.

The term, 'film' may also refer to one layer, that is a single layer, or two or more layers, that is, multiple layers in a film.

The term, 'dielectric layer' means that the material is a non-metal, that is, is not a metal, in terms of the characteristic.

'A single glazing unit (SGU)' refers to one substrate having a constant thickness provided with a coating having a constant thickness. For example, a transparent substrate, that is, a glass of 12 mm or less provided with a coating can be mentioned.

An 'uncoated surface' refers to an uncoated surface of two surfaces of the single glazing unit.

A 'coated surface' refers to a coated surface of two surfaces of the single glazing unit.

A 'double glazing unit (DGU)' refers to a unit composed of two substrates and a hollow layer between the substrates. For example, a transparent substrate, that is, a glass of 6 mm provided with a coating, is provided on an outer surface, a hollow layer (air layer) of 12 mm exists under the substrate, and a transparent substrate, that is, a glass of 6 mm without a coating, may be provided under the hollow layer. The substrate without a coating is disposed to face an inner surface.

The double glazing unit has a total of four surfaces. An outer surface of a coated substrate into which light enters is referred to as a 'first surface', an inner surface, that is, a surface in contact with the hollow layer, is referred to as a 'second surface', a surface facing the hollow layer, of uncoated substrate surfaces disposed inside with the hollow layer interposed therebetween, is referred to as a 'third surface', and a surface facing the inside is referred to as a 'fourth surface'.

'External reflection' represents reflection on the first surface of the double glazing unit or reflection on the uncoated surface in the single glazing unit, and 'internal reflection' represents reflection on the fourth surface of the double glazing unit or reflection on the coated surface in the single glazing unit.

An 'insulation glazing unit (IGU)' is a unit composed of at least two substrates and a hollow layer between the substrates, and embraces a double glazing unit (DGU) and a triple glazing unit (TGU).

'Emissivity' is a criterion representing how light is absorbed and reflected at a given wavelength, and generally satisfies the following equation.

(Emissivity)=1−(Reflectance)

The lower the emissivity, the more reflections occurs and the more infrared energy is reflected, and thus, less heat is transferred and a thermal transmittance value is lowered, thereby increasing an insulation effect. For example, a general uncoated glass has emissivity of about 0.84, and the emissivity is lowered when the glass is coated.

A solar heat gain coefficient (SHGC, also referred to as a 'solar heat gain rate') represents a ratio of solar energy entering through a window, of incident solar energy. In the present specification, the solar heat gain coefficient represents a value measured under the conditions described in ISO 9050.

A 'shading coefficient (SC)' is a value of a solar heat gain rate/0.87.

An 'optical thickness' is a value obtained by multiplying a physical thickness by a reflectance index at a wavelength of 550 nm.

A 'visible absorption rate' represents a value obtained by subtracting coated surface visible reflectance (%) from visible transmittance (%) (visible absorptance (%)=visible transmittance (%)−coated surface visible reflectance (%)).

'Selectivity' represents a value obtained by dividing visible transmittance (TL) by a solar heat gain coefficient (SHGC) (TL/SHGC).

'Δhab' (a color change value depending on an angle of an external reflection color (or an uncoated surface reflection color)) is a value obtained by subtracting hab at Rext 0° from hab at Rext 600 (Δhab=hab at Rext 60°−hab at Rext 0°).

$hab[°]=A\ TAN(b^*/a^*) \times 180/PI$

According to an exemplary embodiment of the present invention, a transparent substrate provided with a multi-layered coating is provided, the coating including the following in an order from the substrate: a first dielectric film including one or more dielectric layers, a first metallic lower protective layer, a first metallic layer having an infrared (IR) reflection characteristic, a first metallic upper protective layer, a second dielectric film including two or more dielectric layers, a second metallic lower protective layer, a second metallic layer having an infrared (IR) reflection characteristic, a second metallic upper protective layer, and a third dielectric film including one or more dielectric layers, wherein the dielectric layer includes a metal oxide, a metal nitride, or a metal oxynitride, the metal is one or more selected from the group consisting of Si, Zn, Nb, and Sn, and Zr may be included as a dopant, the metal protective layer includes one or more selected from the group consisting of Ti, Ni, Cr, and Nb, the metallic layer is Ag (silver) or a Ag-containing metal alloy, a normal emissivity is 2.0% or less, and a difference between a coated surface reflectance and an uncoated surface reflectance is 21% or more.

As shown in FIG. 1, the transparent substrate according to an exemplary embodiment of the present invention is provided with a multi-layered coating, the coating including the following in an order from the substrate: a first dielectric film 10 including at least one dielectric layer, a first metallic lower protective layer 20, a first metallic layer 30 having an infrared (IR) reflection characteristic, a first metallic upper protective layer 40, a second dielectric film 50 having two or more dielectric layers, a second metallic lower protective layer 60, a second metallic layer 70 having an infrared (IR) reflection characteristic, a second metallic upper protective layer 80, and a third dielectric film 90 including one or more dielectric layers.

Hereinafter, each of the films and layers will be described.

[Dielectric Film and Dielectric Layer]

The dielectric film may be provided above and below the metallic layer. For example, two metallic layers are used, at least three dielectric films may be provided.

As shown in FIG. 1, three dielectric films, that is, the first dielectric film 10, the second dielectric film 50, and the third dielectric film 90 may be used at different positions, respectively.

The first dielectric film 10 is disposed directly on the substrate and under the first metallic lower protective layer 20. The second dielectric film 50 is disposed on the first metallic upper protective layer 40 and under the second metallic lower protective layer 60. The third dielectric film 90 is disposed on the second metallic upper protective layer 80.

Each of the dielectric films includes one or more dielectric layers. Here, the dielectric layer includes a metal oxide, a metal nitride, or a metal oxynitride, the metal is one or more selected from the group consisting of Si, Zn, Nb, and Sn, and Zr may be included as a dopant. For example, the dielectric film may include zinc oxide (ZnO), a silicon nitride ($Si_xN_y$) (in particular, $Si_3N_4$), or niobium nitride (NbN). The dielectric films may be identical to or different from each other.

It is preferred that the second dielectric film 50 includes two or more dielectric layers. In this case, it is preferred to provide an absorption layer 52 between the two dielectric layers. For example, as shown in FIG. 2, the second dielectric film may be provided with two dielectric layers 51 which wrap the absorption layer 52 above and below in a sandwich form with the absorption layer 52 interposed therebetween. It is preferred that the absorption layer 52 has visible absorptance of 10% or more. The absorption layer 52 simultaneously absorbs visible rays while serving as a regulator which may adjust a reflectance difference between the upper and lower layers. That is, when there is no absorption layer 52 between the dielectric layers, an uncoated surface reflectance and a coated surface reflectance will be almost the same, but in an exemplary embodiment of the present invention, a difference between the uncoated surface reflectance and the coated surface reflectance may occur due to the absorption layer 52. This may lower the normal emissivity.

When increasing the thickness of metal protective layers 40 and 60, instead of using the absorption layer 52, the difference between the uncoated surface reflectance and the coated surface reflectance may occur.

It is preferred that an optical thickness ratio of the dielectric layer 51 on the upper part of the absorption layer 52 to the dielectric layer 51 on the lower part the absorption layer 52 (the dielectric layer on the upper part of the absorption layer/the dielectric layer on the lower part of the absorption layer) is 1 or more. When the ratio is less than 1, the uncoated surface reflectance is decreased, and the coated surface reflectance is increased. It is more preferred that the value is 3 or more.

It is preferred that an optical thickness ratio of the second dielectric film 50 to the first dielectric film 10 (second dielectric film 50/first dielectric film 10) is 4 or more. The mason is that when the value is less than 4, the uncoated surface reflectance is decreased to 30% or less, and when the thickness of the metallic layer is increased or the thickness of the dielectric film is changed for complementing the uncoated surface reflectance, a problem arises in that the transmission color and the reflection color represent a green-based color.

It is preferred that the optical thickness ratio of the third dielectric film 90 to the second dielectric film 50 (third dielectric film 90/second dielectric film 50) is 0.5 or less. The reason is that when this value is more than 0.5, the coated surface reflectance is increased. For example, the coated surface reflectance may be more than 13%.

It is preferred that the physical thickness ratio of the dielectric layer 51 on the upper part of the absorption layer 52 to the dielectric layer 51 on the lower part of the absorption layer 52 (the dielectric layer on the upper part of the absorption layer/the dielectric layer on the lower part of the absorption layer) is 1 or more. That is, it is preferred that the dielectric layer on the upper part of the absorption layer is thicker. When the physical thickness ratio is less than 1, the uncoated surface reflectance is decreased and the coated surface reflectance is increased. It is more preferred that this value is 3 or more.

The physical thickness of the first dielectric film 10 is preferably 10 to 30 nm. The physical thickness of the second dielectric film 50 is preferably 49 to 112 nm. The physical thickness of the absorption layer 52 is preferably 2 to 4 nm. The physical thickness of the third dielectric film 90 is preferably 27 to 38 nm.

It is preferred that a physical thickness ratio of the second dielectric film 50 to the first dielectric film 10 (second dielectric film 50/first dielectric film 10) is 4 or more. This means that the first dielectric film 10 is relatively thin, and the second dielectric film 50 is relatively thick. The reason is that when this value is less than 4, the uncoated surface reflectance is decreased to 30% or less, and when the thickness of the metallic layer is increased or the thickness of the dielectric film is changed for complementing the uncoated surface reflectance, there arises a problem in that the transmission color and the reflection color are represented as a green-based color. It is more preferred that the physical thickness ratio is 5 or more.

In addition, it is preferred that the physical thickness ratio of the third dielectric film 90 to the second dielectric film 50 (third dielectric film 90/second dielectric film 50) is 0.5 or less. That is, it is preferred that the third dielectric film 90 is thinner. The reason is that when this value is more than 0.5, the uncoated surface reflectance is increased. For example, the uncoated surface reflectance may be more than 13%.

According to an exemplary embodiment of the present invention, the normal emissivity, the uncoated surface reflectance, the coated surface reflectance, the visible transmittance, and the solar heat shading coefficient may all be adjusted to have desired values, by appropriately adjusting the physical thickness ratio and the optical thickness ratio of the dielectric film, and the physical thickness ratio and the optical thickness ratio of the dielectric layer, as described above.

[Metallic Layer and Metal Protective Layer]

The substrate according to an exemplary embodiment of the present invention includes two or more of metallic layers 30 and 70.

The metallic layers 30 and 70 are composed of silver (Ag) or a silver (Ag)-containing metal alloy. As the silver (Ag)-containing metal alloy, for example, a silver (Ag)-gold (Au) alloy, a silver (Ag)-palladium (Pd) alloy, or the like may be used.

The metallic layers 30 and 70 have an infrared (IR) reflection characteristic.

On and under each of the metallic layers 30 and 70, a pair of metal protective layers 20, 40, 60, and 80 which wrap the metallic layers 30 and 70 above and below in a sandwich form with the metallic layers interposed therebetween is provided.

The metal protective layers 20, 40, 60, and 80 include one or more metals selected from the group consisting of Ti, Ni, Cr, and Nb. Preferably, Ni—Cr may be used. In this case, it is preferred that at least a portion of chromium is converted to a nitride during a sputtering process.

It is preferred that a sum of the physical thickness of each of the metallic layers is 27 to 33 nm. The reason is that when the sum of the physical thickness is less than 27 nm, the solar heat shading coefficient will be more than 30% under the single glazing unit (SGU) condition, and when the sum of the physical thickness is more than 33 nm, the CIELAB color coordinate a* value of the visible transmission color will be −7 or less under the single glazing unit (SGU) condition.

Specifically, the physical thickness of the first metallic layer is preferably 14 to 17 nm, and the physical thickness of the second metallic layer is preferably 13 to 16 nm.

It is preferred that all of the metal protective layers have the physical thickness of 0.5 to 2 nm.

According to an exemplary embodiment of the present invention, an overcoating layer 110 may be further included on the upper part of the third dielectric film 90. FIG. 3 represents a transparent substrate further including the overcoating layer 110 on the upper part of the third dielectric film 90. It is preferred that the overcoating layer 110 is one or more selected from the group consisting of a $TiO_x$, a $TiO_xN_y$, a $TiN_x$, and Zr dopants. For example, $TiZr_xO_yN$ (wherein x is 0.5 to 0.7, y is 2.0 to 2.5, and z is 0.2 to 0.6) may be used. $TiO_x$ and Zr, and $TiN_x$ and Zr, may be used.

[Transparent Substrate]

As shown in FIG. 4, a substrate 120 is provided under the multi-layered coatings 10-90. The substrate 120 is a transparent substrate, and preferably a glass substrate. As shown in FIG. 4, the glass substrate 120 is disposed directly under the first dielectric film 10. As a process of forming the multi-layered coating on the glass substrate 120, a common sputtering process may be used.

The transparent substrate according to an exemplary embodiment of the present invention has a normal emissivity of 2.0% or less, preferably 1.7% or less, and more preferably 1.5% or less, based on a single glazing unit (SGU). The numerical value is at a very low level coming close to a transparent substrate including three metallic layers (triple low-E coating).

In the transparent substrate according to an exemplary embodiment of the present invention, a difference between the coated surface reflectance and the uncoated surface reflectance is 21% or more, based on the single glazing unit. The transparent substrate according to an exemplary embodiment of the present invention is characterized by having a large difference between the coated surface reflectance and the uncoated surface reflectance. When the uncoated surface reflectance is high, the coated surface reflectance is accordingly generally high. The present invention is, unlike the general case, characterized in that the uncoated surface reflectance is increased and the coated surface reflectance is lowered, whereby the difference therebetween is large. Particularly, the low coated surface reflectance in the visible region increases the IR coated surface reflectance to decrease the emissivity, thereby maximizing a low emissivity substrate (low E) characteristic.

In the transparent substrate according to an exemplary embodiment of the present invention, the CIELAB color coordinate a* value of the uncoated surface reflection color is preferably −2.5 to 0.5, and the CIELAB color coordinate b* value of the uncoated surface reflection color is preferably −7 to −3.

The CIELAB color coordinate a* value of the visible transmission color is preferably more than −7, and the CIELAB color coordinate b* value of the visible transmission color is preferably less than 1.

It is preferred that a color change value (Δhab) depending on the angle of the uncoated surface reflection color is −7 to 7. Herein, Δ?hab is a value obtained by subtracting hab at Rext 0* from hab at Rext 60° (Δhab=hab at Rext 60–hab at Rext 0).

The selectivity (TL/SHGC) is preferably 1.5 or more, more preferably 1.65 or more, and most preferably 1.7 or more.

It is preferred that the transparent substrate according to an exemplary embodiment of the present invention has uncoated surface reflectance of 27 to 32% and coated surface reflectance of 6% or less, in the single glazing unit. In addition, it is preferred that the visible transmittance in the single glazing unit is 39 to 44% and the solar heat shading coefficient in the single glazing unit is 30% or less.

It is preferred that the transparent substrate according to an exemplary embodiment of the present invention has a CIELAB color coordinate a* value of the uncoated surface reflection color in the single glazing unit of −2.5 to 0.5, and a CIELAB color coordinate b* value of the uncoated surface reflection color in the single glazing unit of −7 to −3. In addition, it is preferred that the CIELAB color coordinate a* value of the visible transmission color in the single glazing unit is more than −7, and the CIELAB color coordinate b* value of the visible transmission color in the single glazing unit is less than 1. It is preferred that the color change value (Δhab) depending on the angle of the uncoated surface reflection color in the single glazing unit is −7 to 7, wherein Δhab is hab at Rext 60°−hab at Rext 0°.

[Insulation Glazing Unit]

According to another exemplary embodiment of the present invention, an insulation glazing unit which is an insulation glazing unit including two or more glass substrates which are spaced apart in parallel with each other is provided, wherein one or more organic substrates of the substrates is the transparent substrate. The insulation glazing unit preferably includes two or more substrates which are maintained as a chassis structure and separate an outer space and an inner space, and one or more gas separation interfaces are disposed between the two substrates. FIG. 5 shows the insulation glazing unit according to an exemplary embodiment of the present invention. The insulation glazing unit includes two or more substrates (glass), and the interface between the two substrates (glass) is an air layer.

In the transparent substrate according to an exemplary embodiment of the present invention, visible transmittance is preferably 35 to 40%, based on a double glazing unit. It is preferred that the solar heat shading coefficient is 25% or less, based on the double glazing unit.

It is preferred that the insulation glazing unit according to an exemplary embodiment of the present invention has a difference between the external reflectance and the internal reflectance of 15% or more, based on the double glazing unit. In addition, the external reflectance is preferably 30 to 35%, based on the double glazing unit, and the internal reflectance is preferably 15% or less, based on the double glazing unit. The difference between the external reflectance and the internal reflectance is preferably 18% or more, and more preferably 20% or more.

The transparent substrate according to an exemplary embodiment of the present invention is characterized by having a large difference between the external reflectance and the internal reflectance. As described above regarding Table 3, when the external reflectance is high, the internal reflectance is accordingly also generally accordingly high. The present invention is, unlike the general case, characterized in that the external reflectance is increased while the internal reflectance is decreased to have a large difference therebetween. Particularly, the low internal reflectance in the visible region increases the IR internal reflectance to decrease the emissivity, thereby maximizing a low emissivity substrate (low E) characteristic.

The CIELAB color coordinate a* value of the external reflection color in the double glazing unit is preferably −3 to 0, and the CIELAB color coordinate b* value of the external reflection color in the double glazing unit is preferably −7 to −3.

The CIELAB color coordinate a* value of the visible transmission color in the double glazing unit is preferably more than −7.5, and the CIELAB color coordinate b* value of the visible transmission color in the double glazing unit is preferably less than 1.

The insulation glazing unit is the double glazing unit, and is produced by sealing two sheets of glass with an air layer interposed therebetween. Various combinations are possible according to the kinds of glass. The insulation glazing unit has high insulation and soundproofing effects as compared with a general glass, and is excellent for preventing condensation.

The insulation glazing unit has the air layer between the two substrates, but may be filled with a gas other than air such as argon.

The insulation glazing unit may be used for architecture, automobiles, furniture, household appliances, or the like.

Hereinafter, the present invention will be described in detail by way of examples, however, the following examples only illustrate one aspect of the present invention, and the scope of the present invention is not limited to the examples.

Examples and Comparative Examples

Two substrates having different materials and thicknesses were manufactured. Each of the materials and thicknesses is as listed in the following Table 4.

TABLE 4

| | Example | | Comparative Example | |
|---|---|---|---|---|
| | Material | Thickness (nm) | Material | Thickness (nm) |
| Overcoating layer | TiZrON | 2 | TiO2 | 2 |
| Third dielectric film | Si3N4 | 34 | Si3N4 | 33 |
| | ZnO | 3 | ZnO | 5 |
| Second metalic upper protective layer | NiCr | 1 | NiCr | 0.7 |
| Second metalic layer | Ag | 14 | Ag | 14 |
| Second metalic lower protective layer | NiCr | 1 | NiCr | 1.2 |
| Second Dielectric dielectric layer film | ZnO | 3 | ZnO | 5 |
| | SnZnO | 14 | | |
| | SiZrN | 23 | | |
| | Si3N4 | 22 | Si3N4 | 50 |
| Absorption layer | NbN | 3 | NbN | 2.5 |
| Dielectric layer | Si3N4 | 10 | Si3N4 | 28 |
| | ZnO | 3 | ZnO | 5 |
| First metalic upper protective layer | NiCr | 1.5 | NiCr | 1.7 |

TABLE 4-continued

|  | Example | | Comparative Example | |
|---|---|---|---|---|
|  | Material | Thickness (nm) | Material | Thickness (nm) |
| First metalic layer | Ag | 15 | Ag | 18 |
| First metalic lower protective layer | NiCr | 1.5 | NiCr | 0.8 |
| First dielectric film | ZnO | 3 | ZnO | 5 |
|  | Si3N4 | 13 | Si3N4 | 25 |

Experimental Example

For each of the substrates of the examples and comparative examples, transmittance, uncoated surface reflectance, coated surface reflectance (external reflectance and internal reflectance in the case of a double glazing unit), SHGC, selectivity, emissivity, and the like were measured. The double glazing unit is composed of a 6 mm low emissivity coating substrate, a 12 mm air layer, and a 6 mm transparent glass. The measurement results are shown in Tables 5 to 7.

TABLE 5

|  | Transmittance | | | Uncoated surface reflectance | | | Coated surface reflectance | | | SHGCDELETEDTEXTS (NFRC) | Selectivity (NFRC) | Normal-emissivity |
|---|---|---|---|---|---|---|---|---|---|---|---|---|
|  | % | a* | b* | Y | a* | b* | Y | a* | b* | | | |
| Example | 41.3 | −5.8 | −0.5 | 29.0 | −1.0 | −4.0 | 3.5 | 2.1 | −20 | 0.24 | 1.721 | 0.015 |
| Comparative Example | 46.0 | −6.2 | 3.5 | 28.3 | −2.0 | −3.8 | 14.3 | −15 | −9.3 | 0.26 | 1.797 | 0.025 |

(Based on Single Glazing Unit)

TABLE 6

|  | Transmittance | | | External reflectance | | |
|---|---|---|---|---|---|---|
|  | % | a* | b* | Y | a* | b* |
| Example | 38.0 | −6.5 | −0.5 | 30.0 | −1.5 | −4.5 |
| Comparative Example | 41.0 | −7.0 | 3.5 | 30.0 | −2.5 | −3.5 |

(Based on Double Glazing Unit)

TABLE 7

|  | Internal reflectance | | | SHGC (NFRC) | Selectivity (NFRC) |
|---|---|---|---|---|---|
|  | Y | a* | b* | | |
| Example | 11.0 | 0.0 | −10.0 | 0.203 | 1.87 |
| Comparative Example | 18.0 | −10 | −6.0 | 0.220 | 1.86 |

(Based on Double Glazing Unit)

DESCRIPTION OF SYMBOLS

10: first dielectric film
20: first metallic lower protective layer
30: first metallic layer
40: first metallic upper protective layer
50: second dielectric film
51: dielectric layer
52: absorption layer
60: second metallic lower protective layer
70: second metallic layer
80: second metallic upper protective layer
90: third dielectric film
100: coating
110: overcoating layer
120: transparent substrate

The invention claimed is:

1. A transparent substrate provided on a surface thereof with a multi-layered coating to form a coated surface,
the coating comprising the following in an order from the substrate:
a first dielectric film including one or more dielectric layers,
a first metallic lower protective layer,
a first metallic layer having an infrared (IR) reflection characteristic,
a first metallic upper protective layer,
a second dielectric film including two or more dielectric layers,
a second metallic lower protective layer,
a second metallic layer having an infrared (IR) reflection characteristic,
a second metallic upper protective layer, and
a third dielectric film including one or more dielectric layers,
wherein the one or more dielectric layers of the first, second and third dielectric films include a metal oxide, a metal nitride, or a metal oxynitride,
the first and second metallic layers are made of silver (Ag) or a silver (Ag)-containing metal alloy,
wherein a normal emissivity of the coating is 2.0% or less, and a difference between a reflectance of the coated surface and a reflectance of an uncoated surface of the substrate is 21% or more;
wherein the reflectance of the coated surface is 6% or less.

2. The transparent substrate of claim 1, wherein the reflectance of the uncoated surface is 27% to 32%.

3. The transparent substrate of claim 1, wherein an optical thickness ratio of the second dielectric film to the first dielectric film (the second dielectric film/the first dielectric film) is 4 or more.

4. The transparent substrate of claim 1, wherein an optical thickness ratio of the third dielectric film to the second dielectric film (the third dielectric film/the second dielectric film) is 0.5 or less.

5. The transparent substrate of claim 1, wherein the second dielectric film includes two or more dielectric layers and an absorption layer disposed between the two dielectric layers, and an optical thickness ratio of the dielectric layer on an upper part of the absorption layer to the dielectric layer on a lower part of the absorption layer (the dielectric layer on the upper part of the absorption layer/the dielectric layer on the lower part of the absorption layer) is 1 or more.

6. The transparent substrate of claim 1, wherein visible transmittance is 39% to 44%.

7. The transparent substrate of claim 1, wherein shading coefficient (SC) is 30% or less.

8. The transparent substrate of claim 1, wherein in the CIELAB color coordinate system, a* value of an uncoated surface reflection color is −2.5 to 0.5, and in the CIELAB color coordinate system, b* value of the uncoated surface reflection color is −7 to −3.

9. The transparent substrate of claim 1, wherein in the CIELAB color coordinate system, a* value of a visible transmission color is more than −7, and in the CIELAB color coordinate system, b* value of the visible transmission color is less than 1.

10. The transparent substrate of claim 1, wherein a color change value (Δhab) depending on an angle of the uncoated surface reflection color is −7 to 7, wherein the Δhab is (hab at Rext 60°)−(hab at Rext 0°).

11. The transparent substrate of claim 1, wherein a sum of physical thicknesses of the metallic layers is 27 to 33 nm.

12. The transparent substrate of claim 11, wherein the physical thickness of the first metallic layer is 14 to 17 nm, and the physical thickness of the second metallic layer is 13 to 16 nm.

13. The transparent substrate of claim 1, wherein selectivity is 1.5 or more.

14. An insulation glazing unit comprising two or more transparent substrates which are spaced apart in parallel with each other, wherein one or more transparent substrates of the substrates is the transparent substrate of claim 1.

15. The insulation glazing unit of claim 14, wherein a difference between external reflectance and internal reflectance is 15% or more, based on a double glazing unit.

16. The insulation glazing unit of claim 14, wherein in the CIELAB color coordinate system, a* value of an external reflection color is −3 to 0, and a CIELAB color coordinate b* value of the external reflection color is −7 to −3, based on the double glazing unit.

17. The insulation glazing unit of claim 14, wherein in the CIELAB color coordinate system, a* value of a visible transmission color is more than −7.5 and a CIELAB color coordinate b* value of the visible transmission color is less than 1, based on the double glazing unit.

* * * * *